E. N. CAMPBELL.
FLOAT VALVE FOR WATER TANKS.
APPLICATION FILED NOV. 30, 1908.

940,127.

Patented Nov. 16, 1909.

WITNESSES,
Carroll H. Kimball
Henry Peterson

Edwin N. Campbell
INVENTOR,
By Clem. H. Kimball
ATTORNEY.

UNITED STATES PATENT OFFICE.

EDWIN N. CAMPBELL, OF COUNCIL BLUFFS, IOWA.

FLOAT-VALVE FOR WATER-TANKS.

940,127.        Specification of Letters Patent.        Patented Nov. 16, 1909.

Application filed November 30, 1908.  Serial No. 465,149.

To all whom it may concern:

Be it known that I, EDWIN N. CAMPBELL, a citizen of the United States, residing at Council Bluffs, in the county of Pottawattamie and State of Iowa, have invented a new and useful Float-Valve for Water-Tanks, of which the following is a specification.

My invention relates to improvements in float valves such as are used to maintain a level of water in tanks, and more especially for tanks used for watering purposes, where there is a varying and uneven pressure on the supply and where such float valves are in danger of being deranged or tampered with.

The objects of my invention are: first, to obtain a sliding motion of a cut-off valve so that the pressure of the water to be stopped does not work against the action of the float; second, to cut off the water from the supply and arrange the valve so that the float will press the valve closely to its side and prevent leakage; third, to provide a valve which does not easily clog or become leaky; and fourth, to provide a valve which will not be affected by a varying water pressure in the supply. I attain these objects by the device and mechanism illustrated in the accompanying drawing in which—

Figure 1:
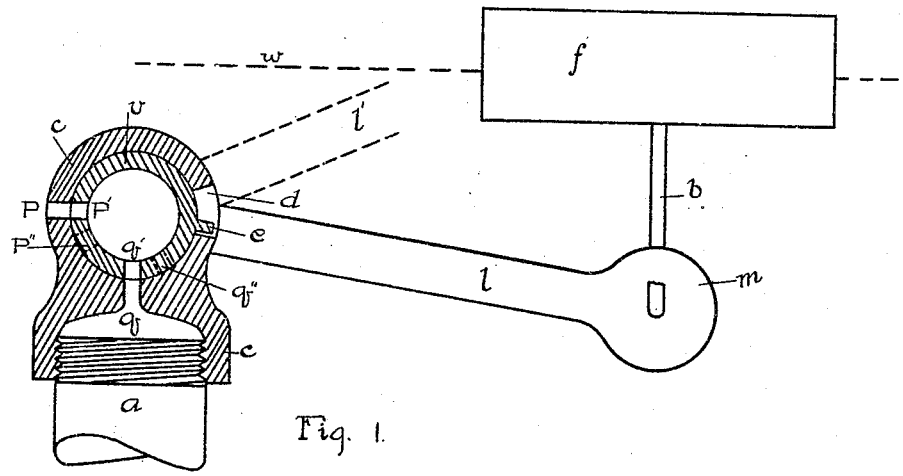
Figure 2:
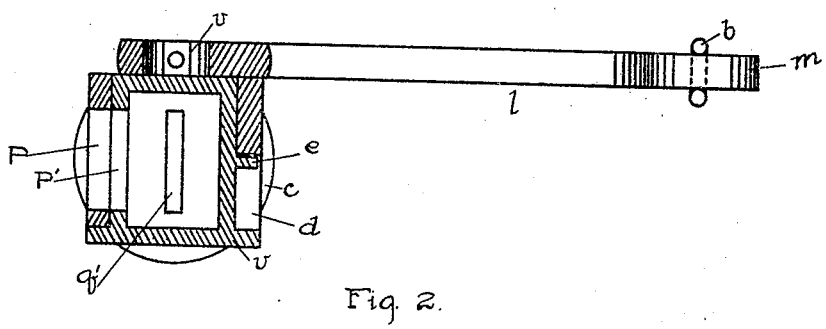
Figure 3:
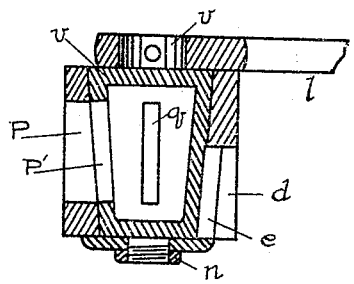
Figure 4:
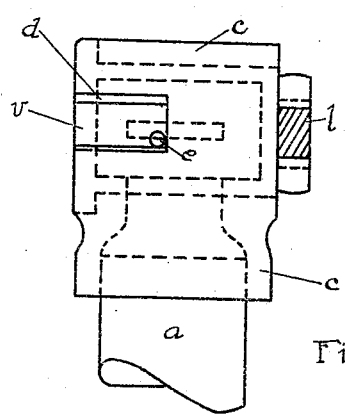

Figure 1 is a cross-section of the valve and housing and a side elevation of the lever and float in diagram; Fig. 2 is a cross-section and plan of valve and lever; Fig. 3 is a cross-section of a modified form of the valve; and Fig. 4 is a side elevation of the valve showing cross-section of lever.

Similar letters refer to similar parts throughout the several views.

In a housing or chamber $c$ adapted to be attached to a pipe $a$ is placed a round or rotary valve $v$. The valve $v$ has the ports $p'$ and $q'$ to correspond with similar openings $p$ and $q$ respectively. Attached to the valve $v$ is a suitable lever $l$ having a weighted end $m$. Attached to the lever $l$ is a float $f$ connected by any suitable means as the wire $b$. The valve $v$ has a projection $e$ arranged to move between the limits of a slot or space $d$ in the housing of the valve $c$, and so arranged that when the ports $p'$ and $q'$ are not in line with the respective ports $p$ and $q$, the valve is pressed down upon the port $q$ to cover the same. The valve $v$ may have any suitable form as that of the taper as shown in Fig. 3, and the nut $n$ may be used to draw and hold the valve $v$ loosely in position in the housing $c$.

$w$ in Fig. 1 indicates the water-line at low level when the valve is open and $f$ the float in the position occupied relative to the water-line $w$.

When water is admitted to the pipe $a$ it will flow as shown in Fig. 1 through the ports $q$, $q'$, $p'$ and $p$ into the space surrounding the valve, when the float $f$ will gradually be lifted against the weight $m$ of the lever $l$ closing the ports $p$ and $q$ until the lever $l$ moves to the position $l'$ when the ports $p'$ and $q'$ will occupy the position indicated by dotted lines at $p''$ and $q''$ respectively. If the valve leaks sufficiently for the ports $p'$ and $q'$ to pass beyond the edges of the ports $p$ and $q$ respectively the projection $e$ will strike the limit of the slot $d$ and the valve $v$ will be thrown thereby and by the operation of the lever down tightly upon the port $q$ if there is any looseness in the valve, more effectively stopping off the water or liquid which is designed to be fed into the space surrounding the valve. Upon the water being lowered in the tank to the line $w$ the ports $p$ and $q$ will again be opened and the water caused to rise again.

I do not desire to be limited by the shape or length or size of any of the parts and the depth of the water in the tank can be changed at will by lengthening or shortening the wire $b$.

I am aware that prior to my invention cut-off valves have been made for use in connection with floats and levers to operate the same automatically, but

What I claim is:

1. In a float valve, the combination of a tank, a supply pipe, a valve housing receiving said supply pipe, the said valve housing having a port communicating with said supply pipe and a rotary valve adapted to open and close said port in said housing and a projection upon said valve at right angles to said port adapted to press the valve against the side of the chamber having the said port, and a weighted lever attached to the end of said valve and a float attached to said lever.

2. In a float valve, the combination of a supply pipe, a valve housing receiving said supply pipe, a port communicating with said supply pipe in said housing, a second port, a rotary valve adapted to open and close both of said ports and a projection upon said valve at right angles with the first named port, and said projection arranged to strike the housing of said valve when said ports are closed by the rotation of said valve, and a weighted lever attached to said rotary valve and extending in the same direction as said projection and a float and connection engaging said weighted lever.

EDWIN N. CAMPBELL.

Witnesses:
C. C. CLIFTON,
P. O. ALLISHOUSE.